United States Patent
Eakin (10) Patent No.: US 6,179,602 B1
(45) Date of Patent: Jan. 30, 2001

(54) APPARATUS AND METHOD FOR DELIVERING AN ADHESIVE SHEET INTO A MOLD

(75) Inventor: William Doyle Eakin, Del Rio, TX (US)

(73) Assignee: Watertown Soles, Inc., Del Rio, TX (US)

( * ) Notice: Under 35 U.S.C. 154(b), the term of this patent shall be extended for 0 days.

(21) Appl. No.: 09/196,805

(22) Filed: Nov. 20, 1998

(51) Int. Cl.[7] .................................................. B29C 31/08
(52) U.S. Cl. ............... 425/305.1; 425/397; 425/DIG. 48
(58) Field of Search ................................ 425/397, 126.1, 425/305.1, 145, DIG. 48; 242/564.4; 83/614, 282, 450, 447

(56) References Cited

U.S. PATENT DOCUMENTS

| | | | |
|---|---|---|---|
| 2,753,938 | * 7/1956 | Thiess | 83/455 |
| 3,779,539 | * 12/1973 | Ziers | 269/91 |
| 3,992,966 | * 11/1976 | D'Agostino | 83/175 |
| 4,459,093 | * 7/1984 | Asano | 425/297 |
| 4,545,544 | * 10/1985 | Rockerath et al. | 242/85 |
| 4,699,031 | * 10/1987 | D'Angelo et al. | 83/23 |
| 4,833,957 | * 5/1989 | Lundgren | 83/56 |
| 4,907,479 | * 3/1990 | Nasu | 83/422 |
| 5,036,740 | * 8/1991 | Tsai | 83/455 |
| 5,170,543 | * 12/1992 | Duncan | 26/95 |
| 5,267,848 | * 12/1993 | Totsuka | 425/297 |

* cited by examiner

*Primary Examiner*—James P. Mackey
*Assistant Examiner*—Emmanuel S. Luk
(74) *Attorney, Agent, or Firm*—Christopher L. Makay (57) ABSTRACT

A support assembly, a knife support assembly operatively linked with the support assembly, and a control system assembly operatively linked with the support assembly and with the knife support assembly deliver an adhesive sheet into a mold. The support assembly includes a side clamp and a center clamp. An adhesive sheet assembly, in cooperative engagement with the support assembly, feeds a continuous supply of adhesive sheet to the support assembly. Accordingly, the adhesive sheet travels across the support assembly and is clamped by the side clamp for cutting by the knife support assembly. The side clamp moves the cut adhesive sheet from the support assembly and, along with a side clamp rib brace coupled with the side clamp, positions the sheet in the mold. The center clamp maintains the remaining adhesive sheet in a position relative to the support assembly ensuring that the side clamp optimally clamps the adhesive sheet upon returning to the support assembly.

13 Claims, 6 Drawing Sheets

APPARATUS AND METHOD FOR DELIVERING AN ADHESIVE SHEET INTO A MOLD

BACKGROUND OF THE INVENTION

1. Field of the Invention

The present invention relates to the manufacture of shoes and, more particularly, but not by way of limitation, to an apparatus and method for delivering an adhesive sheet into a mold.

2. Description of the Related Art

A current method of producing a shoe involves forming a sole by filling a mold with a liquefied polyurethane, closing the mold to apply pressure to the liquefied polyurethane, permitting the liquefied polyurethane to solidify, opening the mold, and removing the completed polyurethane sole. After the formation of the sole, a full wrap "vamp/moccasin" style upper portion of a shoe, called an "upper", is attached to the sole to form a completed shoe. The attachment of the upper involves spreading a glue onto the top of the sole as well as to the bottom of the upper. After the spreading of the glue, the upper is mounted onto the sole and both are placed in a clamp. Once the glue has dried, the upper and sole are removed from the clamp to complete the method.

Although the above method effectively produces a shoe, it suffers the disadvantage of requiring the use of a glue that includes volatile organic compounds. Volatile organic compounds are regulated substances requiring special handling as well as health and safety measures, such as special ventilation and fans, to protect the health of the employees. Consequently, the use of volatile organic compounds complicates the shoe formation process thereby increasing costs.

Accordingly, an apparatus implementing a method that reduces the amount of volatile organic compounds utilized during a shoe formation process will improve shoe manufacture.

SUMMARY OF THE INVENTION

In accordance with the present invention, an apparatus for delivering an adhesive sheet into a mold includes a support assembly, a knife support assembly operatively linked with the support assembly, and a control system assembly operatively linked with the support assembly and with the knife support assembly. As such, when an adhesive sheet is delivered to a mold by the apparatus, the control system assembly allows for the selective operation of the support assembly and the knife support assembly.

The support assembly includes a frame, a side clamp and a center clamp both operatively linked with the frame, a table top secured with the frame for supporting the adhesive sheet placed thereon, and an array of slats to prevent the adhesive sheet from bunching together where each slat includes two ends with each end secured to the frame. Accordingly, the adhesive sheet travels across the support assembly between the slats and the tabletop. The adhesive sheet is then clamped by the side clamp for cutting by the knife support assembly. The side clamp moves the cut adhesive sheet from the support assembly and positions the sheet in the mold. The center clamp maintains the remaining adhesive sheet in a position relative to the support assembly ensuring that the side clamp optimally clamps the adhesive sheet upon returning to the support assembly. Moreover, during operation, the control system assembly alternately engages either the side clamp or the center clamp relative to the adhesive sheet.

The side clamp includes two plate assemblies, each positioned apart from another along the lengthwise edge of the support assembly. Each plate assembly, in turn, includes a top plate and a bottom plate. The top plate and bottom plate come together and press against one another to thus clamp the adhesive sheet. The side clamp further includes a side clamp actuator that is coupled with the support assembly and operatively linked with the control system assembly.

A side clamp rib brace, fixed to the lower surface of each bottom plate of the side clamp, couples the two plate assemblies thereby forming one integral unit defining the side clamp. Additionally, the side clamp rib brace, disposed on the side clamp actuator, positions the cut adhesive sheet held by the side clamp onto the mold assembly as the side clamp moves from the support assembly via the side clamp actuator.

The center clamp includes at least one plate assembly, each positioned apart from another along the widthwise edge of the support assembly. Each plate assembly, in turn, includes a top plate and a bottom plate. The top plate and bottom plate come together and press against one another to thus clamp the adhesive sheet.

The knife support assembly includes a knife, a knife actuator in cooperative engagement with the support assembly, and a knife support platform coupled with the support assembly for supporting the knife actuator mounted thereon. The knife actuator includes an actuator arm having a knife fixed thereon thereby permitting the knife to cut the adhesive sheet. Furthermore, the tabletop of the support assembly provides a guide slot for receiving the blade of the knife therein to ensure that the adhesive sheet is cut as the knife travels across the support assembly.

The apparatus may further include an adhesive sheet assembly, in cooperative engagement with the support assembly, for feeding a continuous supply of adhesive sheet to the support assembly. The adhesive sheet assembly includes a feeder support frame including at least two sidewalls for supporting a supply of adhesive sheet therebetween. The adhesive sheet assembly includes a feeder roller positioned between the sidewalls and operatively engaged with the adhesive sheet for supplying loose adhesive sheet required by the side clamp. The adhesive sheet assembly includes a feeder motor mounted on the feeder support frame and operatively linked with the control system assembly for driving the feeder roller.

In accordance with the present invention, a method for delivering an adhesive sheet to at least one mold positioned on a mold tray includes providing an apparatus, as disclosed above, in cooperative engagement with the mold tray. The mold tray is advanced to a position adjacent to the apparatus so that the mold, while in an opened position, may optimally receive a cut adhesive sheet from the apparatus. A side clamp is engaged to clamp the adhesive sheet and a knife of the knife support assembly is extended along the support assembly to cut the adhesive sheet clamped by the side clamp. The knife is retracted to its position within the knife support assembly. The side clamp is extended toward the open mold. The center clamp is engaged to clamp the adhesive sheet located on the support assembly. The side clamp is disengaged adjacent to the open mold to deliver the cut adhesive sheet to the mold. The side clamp is retracted to its position within the support assembly and the center clamp is disengaged. The mold is closed for facilitating the integration of the cut adhesive sheet within the mold.

It is therefore an object of the present invention to provide an apparatus and method for reducing the amount of volatile organic compounds utilized during a shoe formation process.

It is a further object of the present invention to provide an apparatus and method for delivering an adhesive sheet into a mold for improving shoe manufacture.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. The figures are not necessarily to scale, and some features may be exaggerated to show details of particular components or steps.

As illustrated in FIGS. 1–6, apparatus assembly 1 includes a support assembly 2, a knife support assembly 3, and a control system assembly 15. In operation, an adhesive sheet is fed through support assembly 1, cut by knife support assembly 3, and, then, the resulting cut adhesive sheet is set within a mold assembly 4 so as to integrate the cut adhesive sheet with a polyurethane sole that is formed within sole mold 62.

Support assembly 2 includes a frame 10, a tabletop 8 set over frame 10, and slats 30. The slats 30 are secured at each opposing end to frame 10 above table top 8 using any suitable securing means so that the adhesive sheet travels within a narrow gap created between the slats 30 and the table top 8. The array of slats 30, placed about frame 10, thus acts to prevent the adhesive sheet from potentially bunching together by pressing out any significant gatherings in the adhesive sheet as the sheet travels across the support assembly 2. In addition, the frame 10, in this preferred embodiment, is constructed of square metal tubing. As such, frame 10, tabletop 8, and slats 30 allow for an adhesive sheet to lie flat, and be properly cut, as it advances toward the mold assembly 4.

Support assembly 2 includes side clamp 6 which is located, above and along tabletop 8, between one end of the support assembly 2, nearest to the mold assembly 4, and the slats 30. Specifically, side clamp 6, in this preferred embodiment, comprises two plate assemblies whereby each plate assembly is positioned in parallel with, and spaced apart from, one another along each lengthwise edge of table top 8. Each plate assembly, in turn, includes a top plate and a bottom plate (not shown) which cooperate with one another so as to clamp an adhesive sheet, between each plate assembly, along each lengthwise edge of table top 8. Moreover, a series of side clamp plate assembly actuators 40 are positioned along each plate assembly so as to allow the top plate to move toward and press against the bottom plate thereby clamping the adhesive sheet between the two plates. In this preferred embodiment, side clamp plate assembly actuators 40 are pneumatic cylinders, however, those skilled in the art will recognize other suitable means for actuating side clamp 6. Side clamp plate assembly actuators 40 are engaged and disengaged according to a preset operative program executed by the control system assembly 15 that is, in turn, cooperatively linked to side clamp 6. In particular, side clamp plate assembly actuators 40 are engaged and disengaged by allowing a valve (not shown) within each actuator to open and close thereby controlling the flow of compressed air introduced within the pneumatic cylinder by a compressor (not shown) located within control system assembly 15. Ultimately, it is side clamp 6 that moves a cut adhesive sheet from the support assembly 2 and sets the cut adhesive sheet on sole mold 62 within the mold assembly 4.

Figure 1:
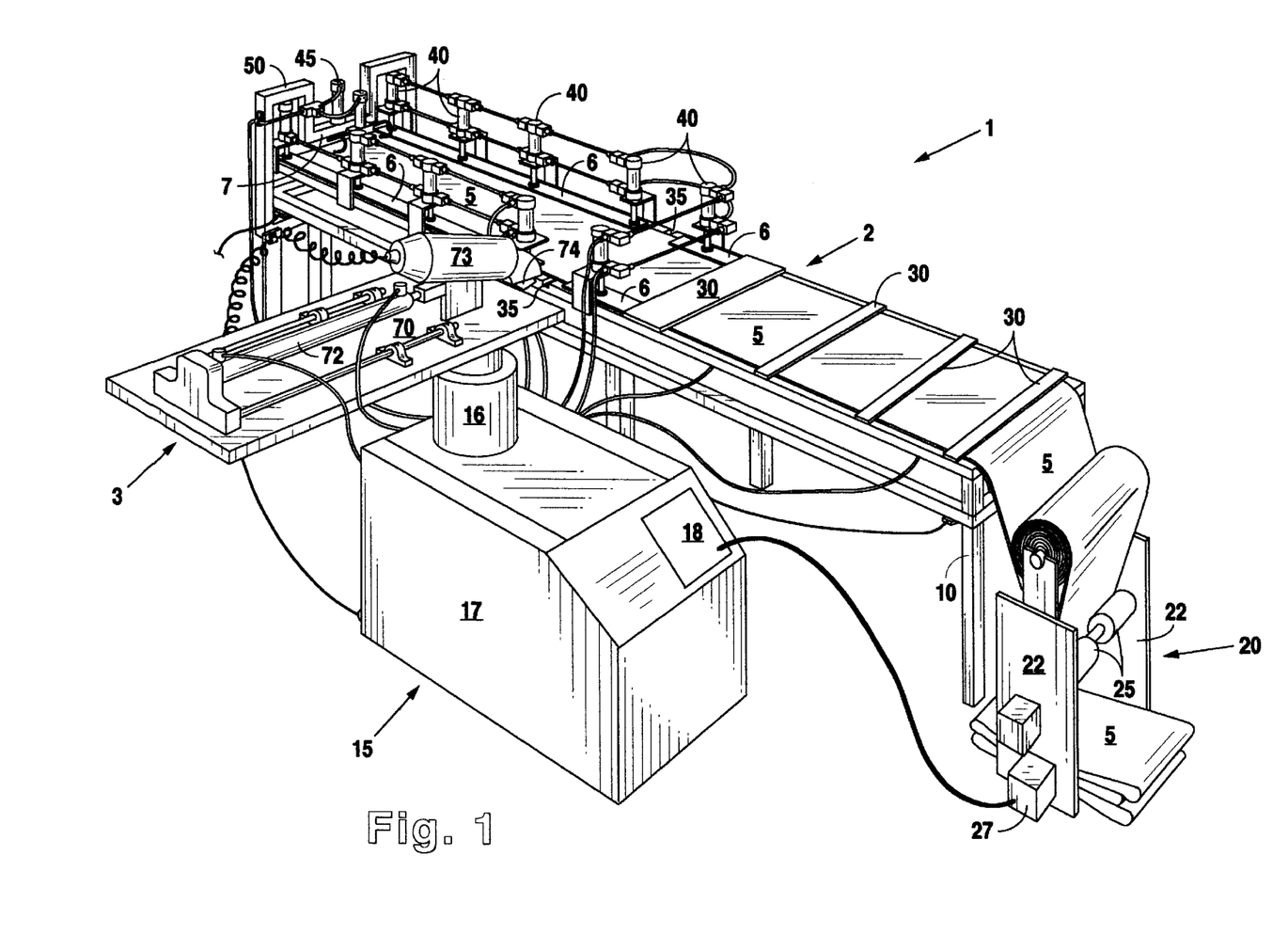
FIG. 1 is a perspective view illustrating an apparatus for delivering an adhesive sheet into a mold.

Support assembly 2 includes center clamp 7 which is located, above and along tabletop 8, at the edge of support assembly 2. Specifically, center clamp 7, in this preferred embodiment comprises one plate assembly that is positioned widthwise along the edge, nearest to the mold assembly 4, of table top 8 between the two plate assemblies of side clamp 6. This single plate assembly, in turn, includes a top plate and a bottom plate (not shown) which cooperate with one another so as to clamp an adhesive sheet, between the plate assembly, along the widthwise edge of table top 8. Moreover, a center clamp actuator 45 is positioned about the plate assembly so as to allow the top plate to move toward and press against the bottom plate thereby clamping the adhesive sheet. In this preferred embodiment, center clamp actuator 45 is a solenoid, however, those skilled in the art will recognize other suitable means for actuating center clamp 6. Center clamp actuator 45 is engaged and disengaged according to a preset operative program executed by the control system assembly 15 that is, in turn, cooperatively linked to center clamp 7. Additionally, as shown in FIG. 1, support assembly 2 is configured to support the center clamp actuator 45 from above as well as allowing side clamp 6 and its respective side clamp plate assembly actuators 40 to pass through the end of support assembly 2 and travel outward toward mold assembly 4 without interfering with the operations of the center clamp 7. Ultimately, by holding the adhesive sheet along the widthwise edge of support assembly 2, center clamp 7 keeps the adhesive sheet in position so that side clamp 6 optimally clamps the adhesive sheet upon its return from mold assembly 4 to support assembly 2.

It must also be emphasized that side clamp 6 and center clamp 7 are configured to interact with one another so that either the side clamp 6 or the center clamp 7 is alternately engaged, at any given time, while the apparatus assembly 1 is in operation. For example, while side clamp 6 is engaged to clamp a cut adhesive sheet, clamp 7 remains disengaged, and does not clamp the adhesive sheet. In this preferred embodiment, it is the control system assembly 15 that executes this alternate engagement via timer relays that energize and deenergize a particular clamp actuator as is discussed in further detail below.

Figure 2:
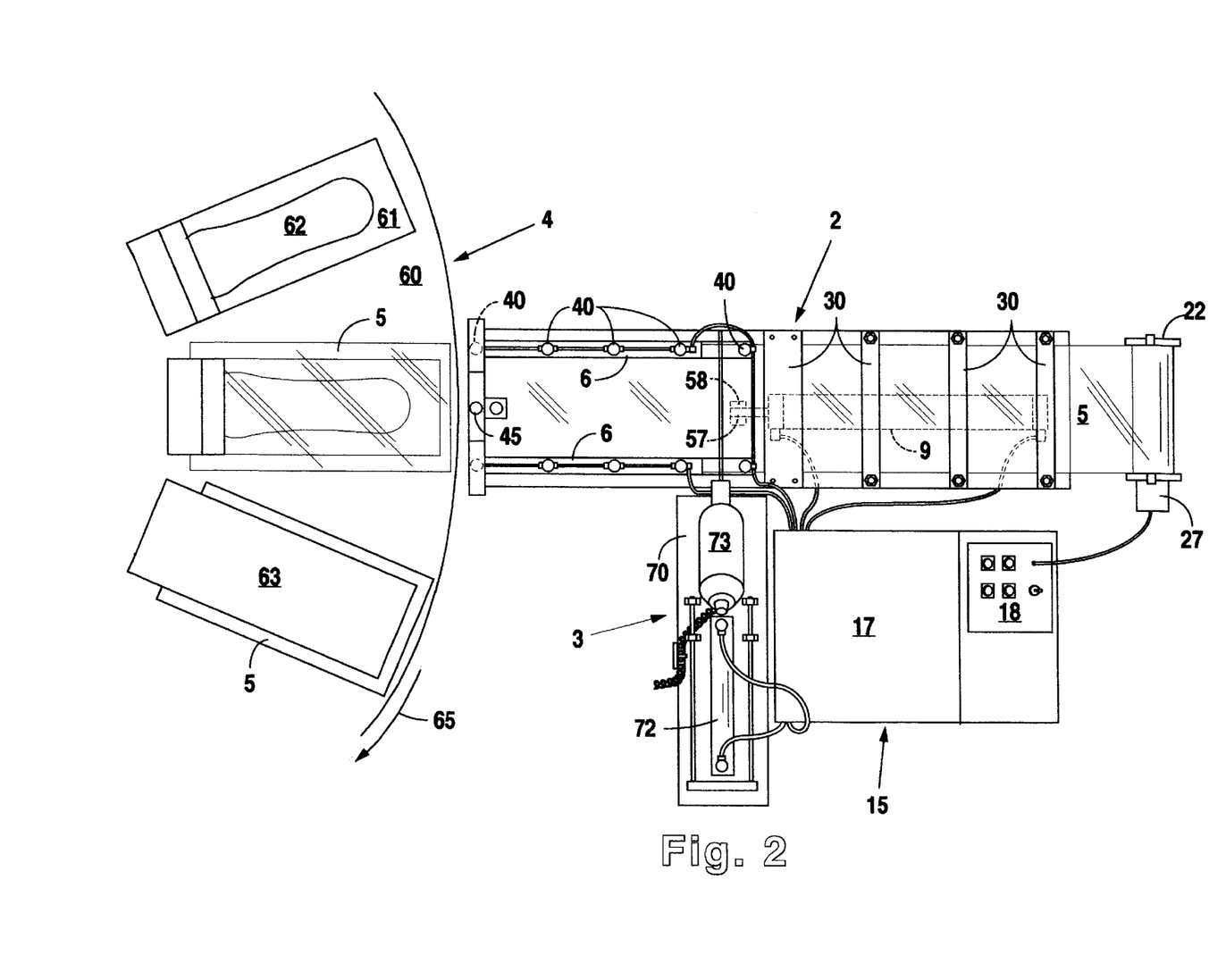
FIG. 2 is a top plan view illustrating the apparatus for delivering an adhesive sheet into a mold.
Figure 4:
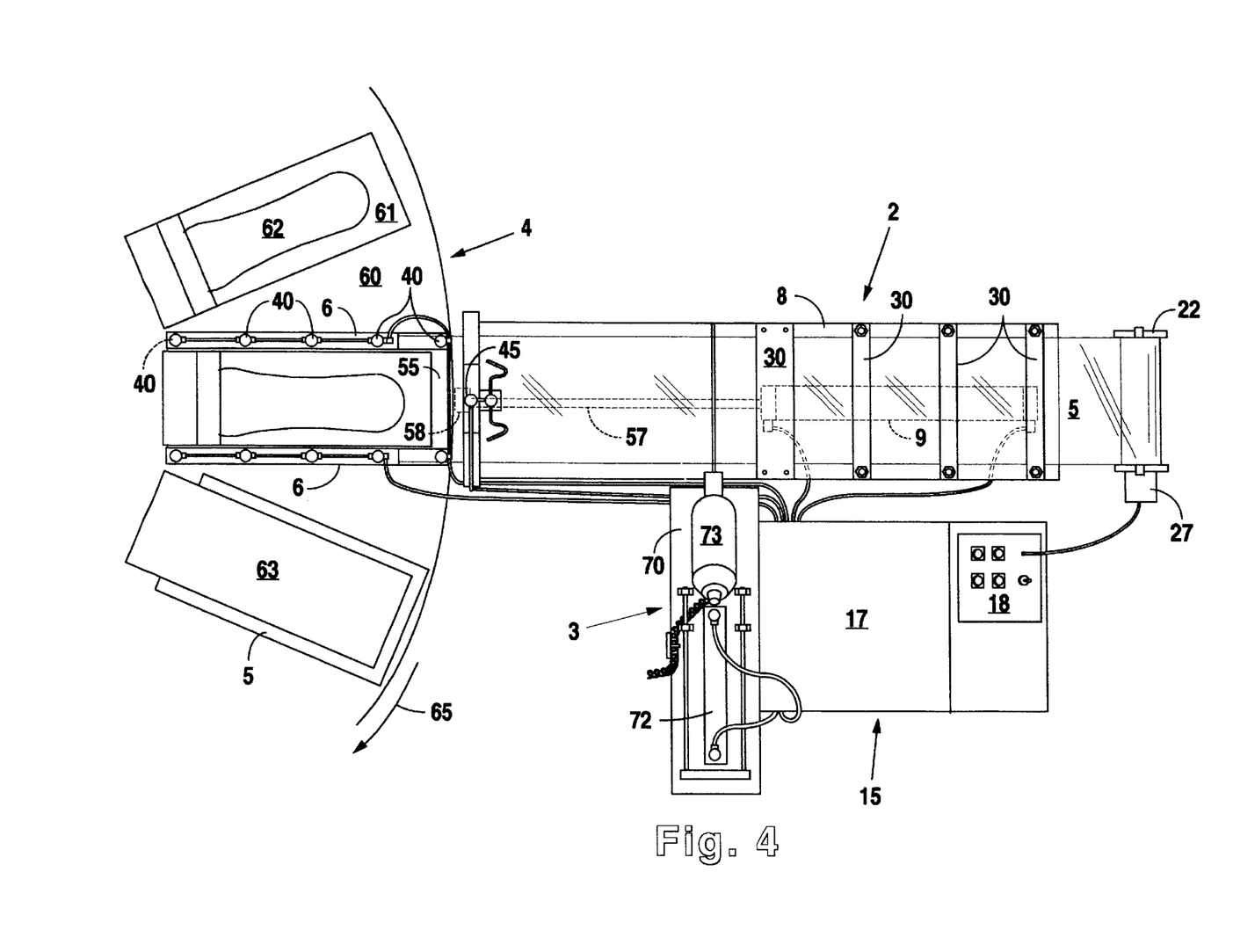
FIG. 4 is a top plan view illustrating the apparatus delivering an adhesive sheet into a mold.

Support assembly 2 further includes a side clamp driver 9. In effect, side clamp driver 9 extends side clamp 6 from the apparatus assembly 1 to the mold assembly 4 so as to deliver a cut adhesive sheet into sole mold 62. Side clamp driver 9 is mounted, using any suitable mounting means, to support assembly 2 at the portion of the support assembly 2 located directly underneath table top 8 under the array of slats 30. See FIG.s 2 and 4. In this preferred embodiment, side clamp driver 9 is a pneumatic cylinder that is engaged and disengaged according to a preset operative program executed by the control system assembly 15 that is, in turn, cooperatively linked to side clamp driver 9.

Side clamp driver 9 includes a side clamp driver arm 57 whereby one end of the side clamp driver arm 57 is secured to a side clamp rib brace 55 via an arm mount 58. As those skilled in the art may recognize, the side clamp driver arm 57 is positioned within the side clamp driver 9 and extends outward from the side clamp driver 9 as the fluid, upon engagement, within the side clamp driver 9 expands volumetrically.

The side clamp rib brace 55, in turn, is a rectangular member, in this preferred embodiment, that is fixed to the side clamp driver arm 57 by arm mount 58. Additionally, side clamp rib brace 55 is fixed, using any suitable fixing means, to the lower surface of each bottom plate that comprises the two plate assemblies of side clamp 6. In effect, the side clamp rib brace 55 performs two distinct functions. First, the side clamp rib brace 55 acts to couple the two parallely spaced plate assemblies of side clamp 6 so that the two plate assemblies act as one integral unit, hence, side clamp 6. It should be added that other embodiments may feature a multiplicity of side clamp rib braces to further secure any given number of plate assemblies together. Second, the side clamp rib brace 55 allows for a cut adhesive sheet, held by side clamp 6, to be moved from the support assembly 2 directly onto the mold assembly 4 as the side clamp driver arm 57 and side clamp rib brace 55 mounted to the side clamp driver arm 57 extend outward from the side clamp driver 9. In a similar manner, the side clamp driver arm 57 may be retracted, by disengaging the side clamp driver 9 via a control signal from the control system assembly 15, so that side clamp 6 can resume its initial position on support assembly 2.

An adhesive sheet feeding assembly 20 is provided adjacent to the edge of support assembly 2 furthest from the mold assembly 4 so as to feed the adhesive sheet to support assembly 2. The adhesive sheet is commercially available from UPACO, and, typically, comes in one continuous rolled sheet. The adhesive sheet feeding assembly 20 includes a feeder support frame 22 having two spaced apart, parallel side walls that aid in supporting the rolled adhesive sheet therebetween; a feed roller 25 that is set between the two side walls of the feeder support frame 22 and is configured to assist in unrolling the rolled adhesive sheet; and a feed motor 27 that is set within one of the two side walls so as to drive feed roller 25. Additionally, the feed motor 27 is controllably linked to control system assembly 15 using any suitable linking means.

In operation, side clamp 6 advances a continuous adhesive sheet, rolled-out and lying flat along support assembly 2, so that a cut adhesive sheet may be ultimately set upon the sole mold 62 within the mold assembly 4. At this time, the adhesive sheet feeding assembly 20 unrolls the adhesive sheet so that the resulting unrolled adhesive sheet is fed into the adjacent edge of support assembly 2 and on through to the entire support assembly 2. Recall that the array of slats 30 are placed about the support assembly 2 so as to prevent the adhesive sheet from potentially bunching together as it is being unrolled by the adhesive sheet feeding assembly 20 and fed into the adjacent edge of support assembly 2.

Specifically, feed roller 25 acts to pull the adhesive sheet from its taught, rolled form so as to allow the unrolled adhesive sheet to loosely collect at the bottom of the adhesive sheet feeding assembly 20. The resulting loose, continuous, and unrolled adhesive sheet is gradually advanced into and through assembly 2 by the repetitive advancing action of side clamp 6. Additionally, control assembly 15, through a preset operative program, is able to actuate the feed roller 25 via feed motor 27 so as to supply enough loose, unrolled adhesive sheet, at any given time, as required by side clamp 6.

Figure 3:
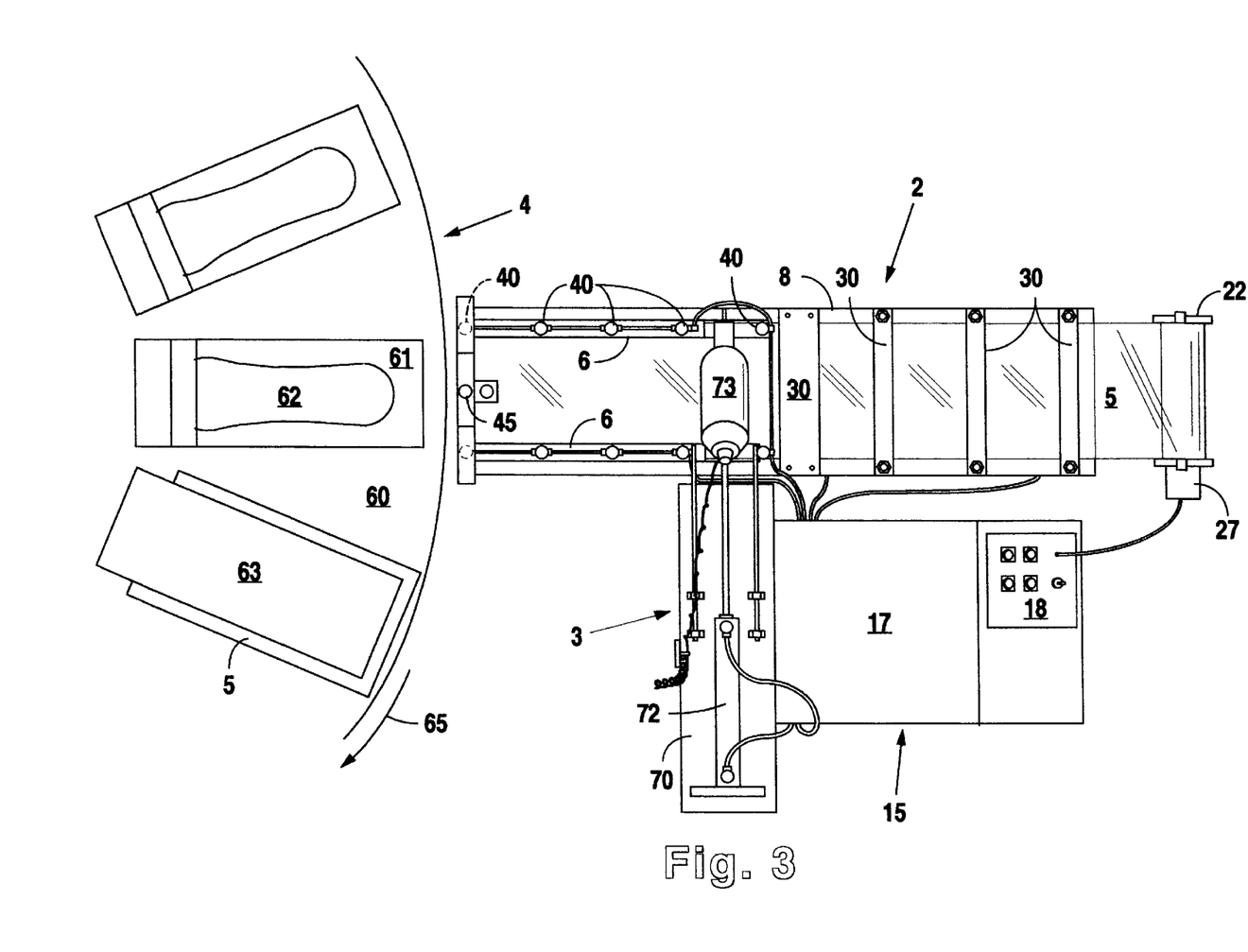
FIG. 3 is a top plan view illustrating the apparatus cutting an adhesive sheet.

The apparatus assembly 1 allows for a cut adhesive sheet to be set within mold assembly 4 so as to integrate the adhesive sheet within a polyurethane sole formed by sole mold 62. In particular, the mold assembly 4 includes a lower die piece 61; an upper die piece 63 that is coupled at one end to the lower die piece 61, using any suitable means, so that the upper die piece 63 closes down upon the lower die piece 61 whereby the resulting interior surface arising from this coupling creates a form, sole mold 62; and a rotating mold tray 60 that secures a series of individually coupled lower and upper die pieces 61, 63 so that they may each optimally receive a cut adhesive sheet from the apparatus assembly 1. In this preferred embodiment, mold assembly 4 is a commercially available molding machine made by Plastak of Italy. In addition, mold tray 60, in this preferred embodiment, rotates in a clockwise fashion as indicated by directional arrow 65. See FIG.s 2–4.

In operation, polyurethane is first poured into the lower die piece 61 so that the sole mold 62 is nearly filled. The mold tray 60 advances toward the support assembly 2 until it is optimally adjacent to the support assembly 2. Side clamp 6 extends from the support assembly 2, via the side clamp driver 9, and then deposits a cut adhesive sheet onto the lower die piece 6 1. See FIG. 4.

In particular, the adhesive sheet, in this preferred embodiment, includes a dry adhesive, an adhesive pad where dry adhesive is deposited on at least one side of the pad, and a removable cover which protects the dry adhesive from unwanted contact until it is ready for bonding with the upper (not shown). Accordingly, the cut adhesive sheet is deposited so that the dry adhesive and removable cover are face up from the sole mold 62 and is deposited so that the adhesive pad is face down on the sole mold 62 whereby the adhesive pad comes in direct contact with the liquefied polyurethane. As the cut adhesive sheet is being placed upon sole mold 62, the upper die piece 63 is lowered onto the lower die piece 61 so that the upper die piece 63 contacts and presses against the cut adhesive sheet and the lower die piece 61 as well as the liquefied polyurethane within sole mold 62. Side clamp 6 disengages and retracts to its initial position on the support assembly 2, as the upper die piece 63 presses against the lower die piece 61, and, thus, leaving the cut sheet clamped between the upper and lower die pieces 63, 61, respectively. As mold tray 60 advances away from support assembly 2, the liquefied polyurethane within sole mold 62 cools and solidifies thereby allowing the cut adhesive sheet and resulting solid polyurethane sole within sole mold 62 to become fixed to one another as one integral piece.

The upper die piece 63 is then lifted up, and the integral piece is removed from sole mold 62. The removable cover, which protects the dry adhesive, is removed from the cut adhesive sheet to allow for the upper and solid polyurethane sole to bond with one another, via the dry adhesive on the cut adhesive sheet, so as to form a shoe. In addition, depending on the specific type of dry adhesive used, it is contemplated that some embodiments of the present invention may still require the application of glue onto the bottom of the upper as it is coupled with the solid polyurethane sole and cut adhesive sheet. In effect, the use of an adhesive sheet reduces the amount of volatile organic compounds utilized during a shoe formation process.

Knife support assembly 3, which cuts the adhesive sheet, includes a knife support platform 70, a knife driver 72, a knife 73, and a knife support platform mount 16 which mounts the knife support assembly 3 to the top of control system housing 17 of the control system assembly 15. In particular, knife driver 72 is fixed to knife support platform 70 using any suitable securing means. In this preferred embodiment, knife driver 72 is a pneumatic cylinder that is engaged and disengaged according to a preset operative program executed by control system assembly 15 that is, in turn, cooperatively linked to side clamp driver 9. Knife driver 72 includes an driver arm whereby knife 73 is fixed, using any suitable securing means, at one end of the driver arm. Thus, knife 73 is permitted to cut the adhesive sheet secured between side clamps 6 as the driver arm of the knife driver 72 extends across the width of support assembly 2.

Moreover, a guide slot 35 is formed within the upper surface of tabletop 8. As such, knife blade 74 of the knife 73 travels along the width of tabletop 8, within guide slot 35, so as to ensure that the adhesive sheet is cut properly. As those skilled in the art may recognize, side clamp 6 may also be configured accordingly to allow for the knife 73 to traverse the full width of support assembly 2.

Figure 5A:
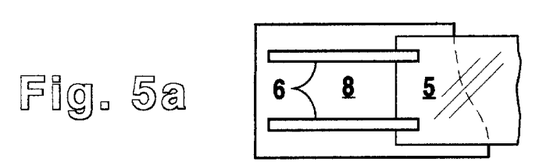
FIG. 5 is a schematic diagram sequentially illustrating cutting and delivering an adhesive sheet into a mold as viewed from above.
Figure 5B:
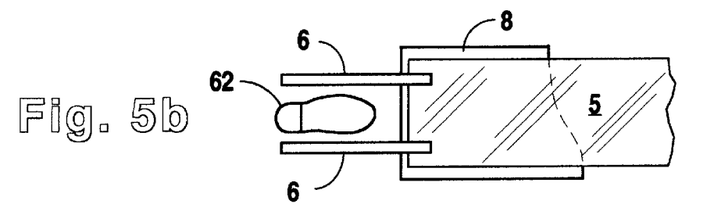
Figure 5C:
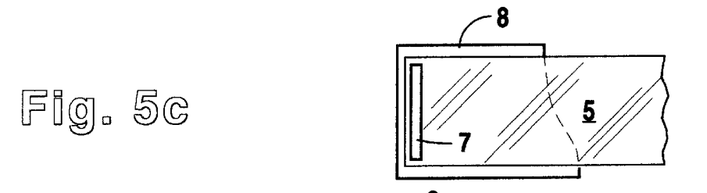
Figure 5D:
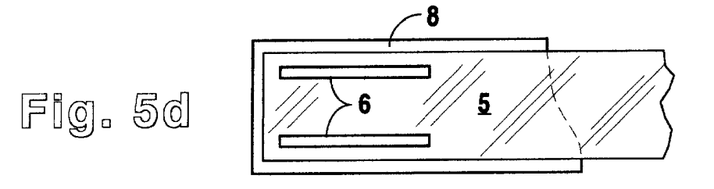
Figure 5E:
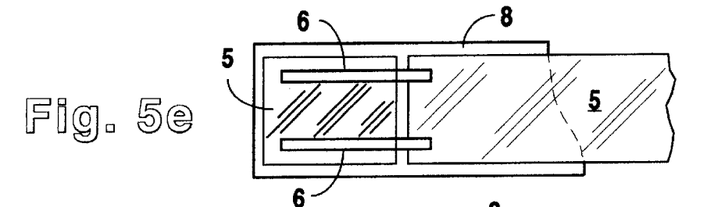
Figure 5F:
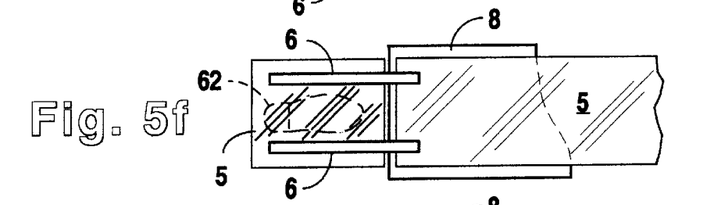

Knife assembly 3 is positioned at one side and near the center of support assembly 2 so as to optimally cut the adhesive sheet. Furthermore, the adhesive sheet is cut just a short distance away from the end of side clamp 6, positioned closest to the center of the support assembly 2, so that side clamp 6, in effect, clamps the entire cut adhesive sheet to be deposited on sole mold 62 as well as partially clamps the continuous adhesive sheet that will be cut accordingly upon the next cutting iteration by knife 73. See FIG. 5(*e*). Therefore, as clamp 6 extends outward toward mold assembly 4, the partially clamped, continuous adhesive sheet is dragged by clamp 6 and thus advanced toward the widthwise edge of support assembly 2 so that it, in turn, may be cut. See FIG. 5(*f*). It should also be emphasized that by holding the adhesive sheet along the widthwise edge of support assembly 2, center clamp 7 keeps the adhesive sheet in position so that side clamp 6 optimally clamps the adhesive sheet upon its return from mold assembly 4 to support assembly 2.

Figure 6:
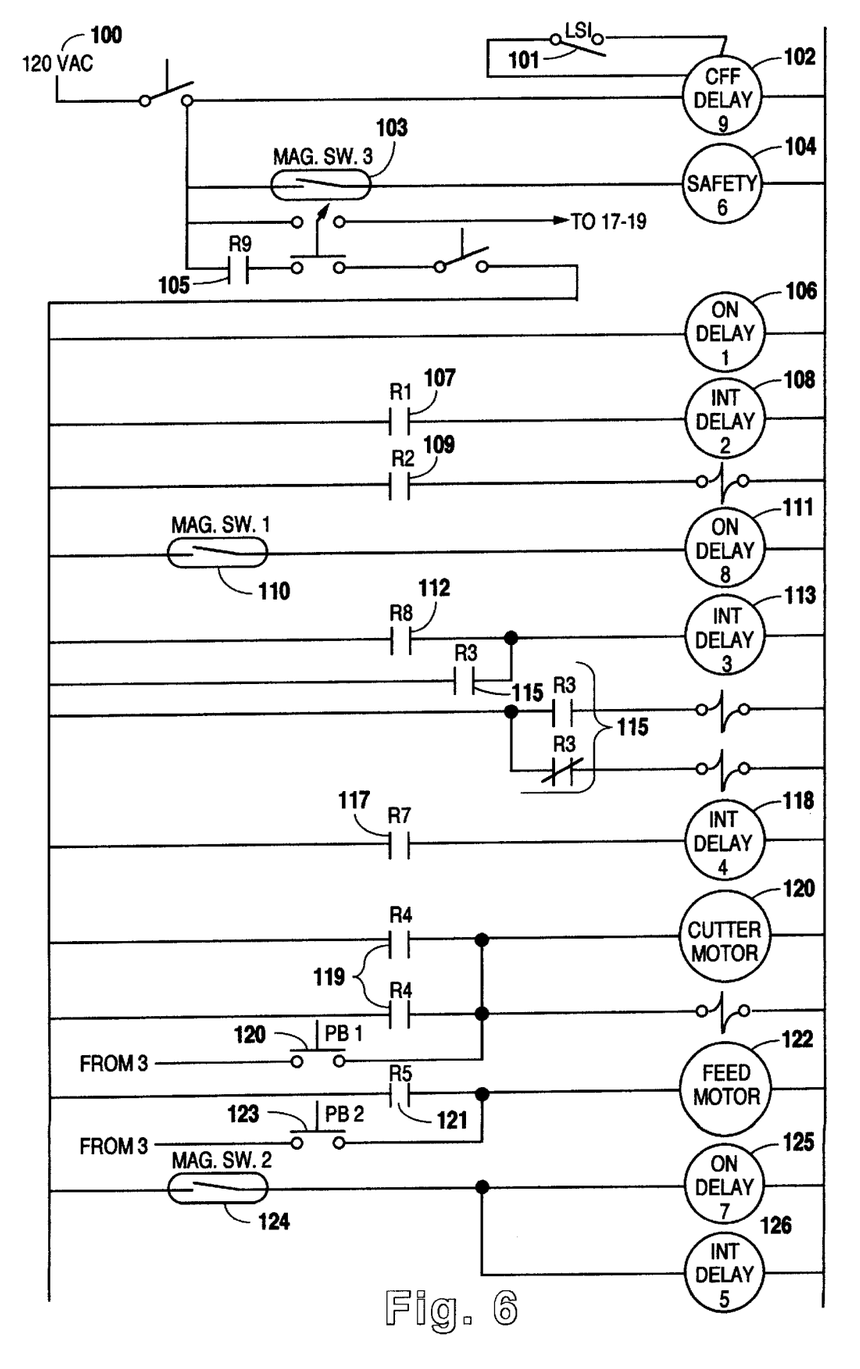
FIG. 6 is a schematic diagram illustrating the control system for the apparatus.

Control system assembly 15 features control system housing 17, which provides a protective covering for various electronic components placed therein as well as fixedly supports the above knife assembly 3. A control panel 18, schematically represented in FIG. 6, is located on the outer surface of control system housing 17, to allow for the selective operation of the assembly apparatus 1 and the various electronic components therein, necessary for the implementation of a preset operative program. Ultimately, control system assembly 15 is cooperatively linked to the apparatus assembly 1 and the mold assembly 4 so as to repetitively deliver a cut adhesive sheet from the apparatus assembly 1 to the mold assembly 4 through the implementation of a preset operative program. It must be emphasized that, among the electronic components depicted in FIG. 6, time relays may be readily substituted by a microprocessor, as one of ordinary skill in the art will recognize.

The preferred method for delivering a cut adhesive sheet from the apparatus assembly 1 to the mold assembly 4 and various electronic components necessary for implementing such method via a preset operative program are schematically illustrated in FIG. 5 and FIG. 6. As such, the adhesive sheet is initially positioned within the support assembly 2 and then is subjected to a repetitive sequence of cutting and delivering such cut adhesive sheet from the support assembly 2 to the mold assembly 4.

Specifically, mold tray 60 advances toward support assembly 2 so that a set of lower and upper die pieces 61, 63 atop mold tray 60 may optimally receive a cut adhesive sheet from the support assembly 2. Upon arriving at the optimal location, mold tray 60 contacts, thereby closing and then releasing a switch 101 within apparatus assembly 1. Switch 101 acts to energize relay 105 which, in turn, energizes relay 107. Relay 107 establishes a time delay before energizing relay 109. Relay 109 then permits delivery of compressed air to the side clamp plate assembly drivers 40 which, in turn, allows side clamp 6 to clamp the adhesive sheet within support assembly 2. Relay 109 further permits delivery of compressed air to the side clamp driver arm 57 set within the side clamp driver 9, which advances the adhesive sheet from the support assembly 2 toward the mold assembly 4.

In particular, the adhesive sheet is initially positioned within the support assembly 2 so that such adhesive sheet is partially clamped as the side clamp plate assembly drivers 40 of side clamp 6 are engaged by relay 109. See FIG. 5(*a*). Relay 109 permits side clamp driver arm 57 to extend the side clamp 6, coupled to side clamp driver arm 57, outward toward shoe mold 62 within mold assembly 4. As such, the partially clamped, continuous adhesive sheet is dragged by side clamp 6 and is therefore advanced toward the widthwise edge of support assembly 2 so that it, in turn, may be cut. See FIG. 5(*b*).

As the side clamp driver arm 57 fully extends outward in tandem with side clamp 6, the opposite end of such arm 57 continues to remain within side clamp driver 9. Such opposite end, however, contacts a magnetic switch 110 that is also located within side clamp driver 9 such that magnetic switch 101 cooperatively engages with the opposite end of the side clamp driver arm 57 at the fully extended position. Magnetic switch 110 acts to energize relay 112 which, in turn, energizes relays 115. Relays 115, while permitting side clamp 6 to be disengaged, establish a time delay before permitting center clamp 7 to be engaged.

In particular, the adhesive sheet, positioned at the edge of support assembly 2, is clamped as the center clamp driver 45 of center clamp 7 is engaged by relays 115. See FIG. 5(*c*). At the same time, while still partially above sole mold 62 and partially above table top 8, side clamp 6 is disengaged by relays 115 so that the adhesive sheet is, thus, clamped just by center clamp 7. See FIG.s 5(*b*) and (*c*).

At this time, relay 109, which is on a time delay, permits the side clamp driver arm 57 to be disengaged so that it is allowed to fully retract into the side clamp driver 9.

As a result, side clamp 6, which is coupled to the side clamp driver arm 57, is allowed to return to its initial position within the support assembly 2. Next, in a similar manner based upon a time delay, relays 115 permit the center clamp driver 45 of center clamp 7 to be disengaged while permitting the side clamp plate assembly drivers 40 to engage side clamp 6 so as to fully clamp the adhesive sheet positioned within support assembly 2. See FIG. 5(*d*).

As it retracts within driver arm 9, the opposite end of the side clamp driver arm 57, that first contacted magnetic switch 110 while in the fully extended position, now contacts magnetic switch 124 that is also located within side clamp driver 9 such that magnetic switch 124 cooperatively engages with the opposite end at the fully retracted position. Magnetic switch 124 acts to energize relay 121 which permits knife driver 72 to be engaged. Magnetic switch 124 also acts to energize relay 117 which, in turn, energizes relays 119. Relays 119 establish a time delay before permitting knife 73 to be engaged, which in this preferred embodiment is a pair of commercially available electric shears, and act to continue to engage side clamp 6 which was initially energized by timed relay 115.

In particular, upon the engagement of the knife driver 72 by relay 121, the adhesive sheet, positioned at the edge of the support assembly 2, is cut widthwise as the driver arm of knife driver 72 extends outwardly, across the full width of support assembly 2. See FIG. 5(e). Knife 73, which is fixed at one end to such driver arm, cuts, via engagement by relay 119, the adhesive sheet as it traverses within guide slot 35 while the driver arm of knife driver 72 is extended to its full length. See FIG. 3. Side clamp 6 continues to remain energized, via relay 119, so as to prevent any gathering or folding of the adhesive sheet during the cutting process. See FIG. 5(e).

At this time when the driver arm of knife driver 72 extends fully, relays 119, which are on a time delay, permit the knife 73 to be disengaged, before permitting side clamp 6 to be engaged. (As shown in FIG.s 5(a) and (f), however, side clamp 6 will quickly be reenergized upon the next succeeding iteration of the above preset operative sequence). In a similar manner, relay 121, which is on a time delay, permits the driver arm of knife driver 72 to be disengaged so that it is allowed to fully retract to its initial position on knife assembly 3. Next, relay 105, which is on a time delay, deenergizes and resets the various electronic components within the control system assembly 15, as mentioned above, for the next preset operative cycle for delivering a cut adhesive sheet to shoe mold 62.

The preferred method for initially positioning an adhesive sheet within the support assembly 2 is described above. The preferred method for repetitively cutting and delivering a cut adhesive sheet to sole mold 62 is, in effect, identical to the preferred method for initially positioning an adhesive sheet within the support assembly 2, as specifically described above, such that the two methods only differ in the placement of the adhesive sheet relative to the support assembly 2. Thus, the actions of clamping a fully cut adhesive sheet and a portion of the continuous adhesive sheet by side clamp 6 and moving the cut adhesive sheet outward by the side clamp driver arm 57 requires the identical cooperative interaction by various components within the apparatus assembly 1 as that cooperative interaction associated with initially positioning the continuous adhesive sheet at the edge of the support assembly via the same preset operative program executed by the control system assembly 15. (Compare FIG.s 5(a) and (b) with FIG.s 5(e) and (f), respectively).

Figure 5G:
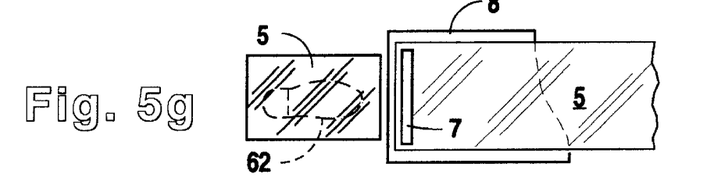

Accordingly, FIG.s 5(a)–(e) show the interaction of various significant components for repetitively cutting and delivering a cut adhesive sheet to sole mold 62 as well as the cooperative interaction associated with initially positioning a continuous adhesive sheet at the edge of the support assembly 2. As such, the adhesive sheet is initially positioned within the support assembly 2 and is then subjected to a repetitive sequence of cutting and delivering a cut adhesive sheet to sole mold 62 in the same manner as described above, beginning with the mold tray 60 contacting switch 101 which allows a cut adhesive sheet to be clamped and moved outward toward mold assembly 4 and so on. In particular, FIG. 5(f) shows a cut adhesive sheet, positioned above shoe mold 62, being clamped by side clamp 6 which, in turn, partially clamps and advances a continuous adhesive sheet toward the edge of support assembly 2 so that it may be cut upon the next iteration of the preset operative cycle. (Compare with the identical operational movement of assembly apparatus 1 in FIG. 5(b)). FIG. 5(g) shows the adhesive sheet placed atop shoe mold 62 at the time where side clamp 6 is disengaged by relays 115 so that the continuous adhesive sheet is, thus, clamped to the edge of support assembly 2 just by center clamp 7. (Compare with the identical operational movement of assembly apparatus 1 in FIG. 5(c)).

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. An apparatus for delivering a cut adhesive sheet into a mold, comprising:
a support assembly for supporting an adhesive sheet and for delivering the cut adhesive sheet into the mold, comprising:
a frame,
a side clamp coupled with the frame for securing the adhesive sheet,
a center clamp coupled with the frame for securing the adhesive sheet, and
a side clamp driver coupled to the side clamp for extending the side clamp into the mold and retracting the side clamp from the mold;
a knife support assembly coupled with the support assembly for cutting the adhesive sheet secured by the side clamp; and
a control system assembly coupled with the support assembly and the knife support assembly, wherein the control assembly engages the side clamp to secure the adhesive sheet and disengages the center clamp to release the adhesive sheet, actuates the knife support assembly to cut the adhesive sheet, actuates the side clamp driver to extend the side clamp into the mold, engages the center clamp to secure the adhesive sheet and disengages the side clamp to release the cut adhesive sheet into the mold, and deactuates the side clamp driver to retract the side clamp from the mold, thereby delivering the cut adhesive sheet into the mold.

2. The apparatus according to claim 1, wherein the knife support assembly comprises:
a knife; and
a knife driver in cooperative engagement with the support assembly, the knife driver including a knife driver arm having the knife fixed thereon thereby permitting the knife to cut the adhesive sheet secured by the support assembly.

3. The apparatus according to claim 2, wherein the knife support assembly further comprises a knife support platform coupled with the support assembly for supporting the knife driver mounted thereon.

4. The apparatus according to claim 1, wherein the support assembly further comprises:
a table top secured with the frame for supporting the adhesive sheet thereon; and
an array of slats for pressing out the adhesive sheet as the sheet travels across the support assembly, each slat including two ends where the ends are secured to the frame adjacent to the tabletop, thereby allowing the adhesive sheet to travel between the slats and the tabletop.

5. The apparatus according to claim 4, wherein the tabletop includes a guide slot for receiving the blade of the knife therein, thereby ensuring that the adhesive sheet is cut as the knife travels across the support assembly.

6. The apparatus according to claim 1, wherein the side clamp moves a cut adhesive sheet from the support assembly and positions the cut adhesive sheet in the mold.

7. The apparatus according to claim 1, wherein the side clamp comprises two plate assemblies, each plate assembly positioned apart from another along the lengthwise edge of the support assembly having a top plate a bottom plate, the bottom plate having a lower surface, and biasing means for biasing the top plate and the bottom plate together.

8. The apparatus according to claim 1, wherein the side clamp driver includes a side clamp rib brace thereon and fixed to the lower surface of the side clamp.

9. The apparatus according to claim 1, wherein the center clamp maintains the adhesive sheet in a position relative to the support assembly, thereby ensuring that the side clamp clamps the adhesive sheet.

10. The apparatus according to claim 1, wherein the center clamp comprises two plate assemblies, each plate assembly positioned apart from another along the lengthwise edge of the support assembly having a top plate a bottom plate, the bottom plate having a lower surface, and biasing means for biasing the top plate and the bottom plate together.

11. The apparatus according to claim 1, wherein the control system assembly engages either the side clamp or the center clamp relative to the adhesive sheet.

12. The apparatus according to claim 1, further comprising an adhesive sheet assembly in cooperative engagement with the support assembly for feeding the adhesive sheet to the support assembly.

13. The apparatus according to claim 12, wherein the adhesive sheet assembly comprises:
- a feeder support frame including at least two sides walls for supporting the adhesive sheet therebetween;
- a feeder roller secured between the two side walls and operatively engaged with the adhesive sheet for positioning the adhesive sheet for delivery to the support assembly; and
- a feeder motor mounted with the feeder support frame and coupled with the control system assembly for driving the feed roller.

* * * * *